3,417,123
HETEROAROMATIC BORON COMPOUNDS AND THEIR PREPARATION

Robert D. Offenhauer, Hopewell Township, Mercer County, N.J., assignor to Mobil Oil Corporation, a corporation of New York
No Drawing. Filed Oct. 22, 1965, Ser. No. 502,625
11 Claims. (Cl. 260—462)

ABSTRACT OF THE DISCLOSURE 5,12-dibora-6,13-dioxarodibenz-(a,h)-anthracenic compounds are prepared by reacting 2,5-diphenylhydroquinone with boron trichloride followed by heating in the presence of aluminum chloride as a catalyst to form heteroaromatic rings. Polymers of high heat resistance are obtained by the condensation polymerization of dihydroxy derivatives of the monomers.

---

This invention relates to polynuclear heteroaromatic boron compounds in the form of difunctional monomers and polymers thereof, as well as the preparation and polymerization of such substances.

A new class of organoboron compounds has been discovered which contain a plurality of both aromatic and heteroaromatic rings with functional groups attached to the boron atoms in the heteroaromatic rings. The new compounds display antiwear characteristics in lubricant compositions. In addition, they have been found to inhibit the tendency toward oxidation in various compositions and polymers, especially those containing hydrocarbons, that are susceptible to oxidative deterioration; such inhibited polymers and compositions being described in detail and claimed in my concurrently filed application Ser. No. 502,424 entitled, "Stabilized Compositions," subsequently abandoned after filing of my continuation-in-part application Ser. No. 583,472 on Sept. 30, 1966.

Linear polymers derived from these novel substances have shown outstanding thermal stability which exceeds that of most thermosetting plastics as well as substantially all thermoplastics. Accordingly, the new polymers show substantial promise for the preparation of resin compositions of superior heat resistance.

The present invention comprises polynuclear heteroaromatic compounds containing at least one 5,12-dibora-6,13-dioxarodibenz-(a,h)-anthracenic unit which may be also designated as structural units of the following type formula:

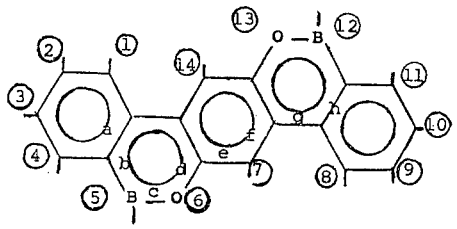

The invention also involves a process for preparing such compounds which includes the reaction of a substituted or unsubstituted 2,5-diphenylhydroquinone with boron trichloride followed by reacting the resulting intermediate product in the presence of aluminum chloride to form two heteroaromatic rings containing boron and oxygen atoms, and additionally comprises the further reaction of this dichloro-heteroaromatic product with a compound containing a hydroxyl group such as water, alcohols, or phenols. Moreover, the invention includes condensation polymers of such organoboron compounds and their preparation by heating, with hydrolysis wherever necessary of the extranuclear substituents on the boron atoms. All proportions are set forth in terms of weight and all temperatures as degrees centigrade unless otherwise stated herein. Narrower aspects of the invention relate to specific compounds and certain types of compounds of the new class, as well as preparatory methods for forming such compounds from specific reactants.

In the 6-membered rings set forth in the illustrative formulas and equations in this specification and claims, a circle is enclosed in the rings to denote that these rings are either benzene rings or display substantial aromatic characteristics as in the case of the heteroaromatic rings. Also, dangling bonds or linkages are shown to denote the locations of ring or nuclear atoms at which either hydrogen or a substituent may be attached, and one or more of the designated nuclear atoms may have a substituent. These substituents may be the same or different radicals or atoms. In the case of nuclear carbon atoms, the substituent may be a hydrocarbyl, halogenated hydrocarbyl, or hydrocarbyloxy radical a nitro or cyano group, or a halogen atom. Either or both of the boron atoms may have a halogen atom or a hydroxyl, hydrocarbyloxy, halogenated hydrocarbyloxy, aminoethoxy, N-hydrocarbyl-aminoethoxy or N,N-dihydrocarbylaminoethoxy group as a substituent. Preferred substituents on the boron atoms include hydroxyl and hydrocarbyloxy radicals and chlorine atoms.

As used herein, the term "hydrocarbyl" is intended to mean a group composed of carbon and hydrogen atoms, such as an alkyl, alkenyl, aryl or alicyclic group or a structural combination of two or more of such groups, e.g., an alkaryl or aralkyl group. Thus, any of the dangling bonds in the preceding structural formula may be attached to a hydrogen atom; an alkyl group (straight-chain or branched-chain) such as a methyl, ethyl, propyl, isopropyl, butyl, isobutyl, tert-butyl, octyl, dodecyl, hexadecyl, octadecyl, tetracosyl, triacontyl, etc. radical; an alkenyl group such as an ethenyl, propenyl, isopropenyl, etc. radical; an alkaryl group such as a methylphenyl, amylphenyl, etc. group; an aralkyl group such as a phenylmethyl, phenyloctyl, etc. radical; an alicyclic group such as cyclohexyl, cyclohexenyl, etc.; an oxyhydrocarbyl group such as any of the aforementioned hydrocarbyl groups linked by a single bond to an oxygen atom, e.g., an alkoxy group such as a methoxy, ethoxy, etc. radical, or an aryloxy group such as a phenoxy, etc. group; a halogen such as chlorine, bromine or iodine; a nitro or cyano group; or a halogenated hydrocarbyl group such as any of the aforementioned hydrocarbyl groups with one or more halogen substituents. The boron atoms may also have still other substituents in the form of a halogenated hydrocarbyloxy radical or an aminoethoxy group having two hydrogen atoms, two of the aforementioned hydrocarbyl groups or one hydrogen atom and one of such hydrocarbyl groups attached to the nitrogen atom of the amino group. Among the hydrocarbyl and substituted hydrocarbyl radicals which are suitable substituents, those containing from 1 to about 30, and particularly from 1 to about 22 carbon atoms are especially preferred.

The new compounds may be prepared by reacting a substituted or unsubstituted 2,5-diphenylhydroquinone with boron trichloride. This organic starting material may be prepared by various methods known in the art, and it may have substituents on any of its carbon atoms except those to which the hydroxyl radicals are attached and at least one adjacent atom on each of the outer rings; that is the 2' or 6' position on one outer benzenoid ring and the 2" or 6" position on the other such ring should have a hydrogen atom attached thereto. Substituents on the diphenylhydroquinone reactant may include any of those mentioned hereinbefore as suitable for nuclear carbon atoms in the reaction products except hydroxyl or other radicals that might interfere with the reaction of boron trichloride with the 1,4-hydroxyl groups of the hydroquinone.

This reaction may be depicted by the general equation:

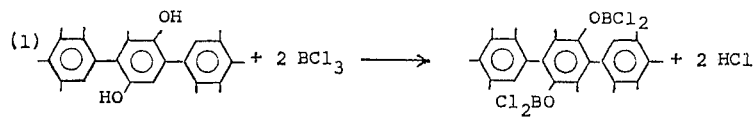

The reaction is desirably carried out by adding a solution of the hydroquinone in methylene chloride to a stoichiometric excess of boron trichloride at temperatures between about 0° and −80° C. (−60° to −80° being preferred) at atmospheric pressure. After about one hour at the low temperature, the reaction mixture is allowed to warm to room temperature over a period of from 3 to 24 hours (16 to 24 hours being preferred to obtain good yields). Excess boron trichloride and solvent are removed by evacuating the reactor leaving the crude product therein, usually in solid form.

The initial product is then reacted in the presence of aluminum chloride according to the following general equation:

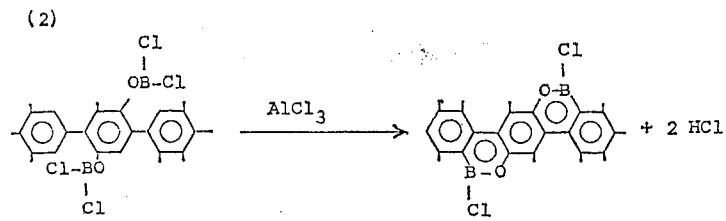

This ring closure reaction may be carried out at temperatures between about 40 and 135° C. (preferably between 70 and 90°) at atmospheric pressure over a period between about 0.5 and 12 hours using a quantity of the aluminum chloride catalyst amounting to about 0.001 to 0.1 mol per mol of reactant. A 5-ring compound is created here by the formation of two heteroaromatic rings in which one chlorine atom attached to each boron atom is split off along with an adjacent hydrogen atom from the adjoining phenyl ring; then the boron atom is linked to the unoccupied bond on the adjacent phenyl group. Thus, a difunctional 5-ring heteroaromatic structure is synthesized from a 3-ring aromatic compound.

The new dichloro compound may be further reacted with water in any form, including moist air or steam vapor, at temperatures ranging from about 0 to 100° C., and preferably between about 20 and 30° C., to form the corresponding dihydroxy compound according to the following general equation:

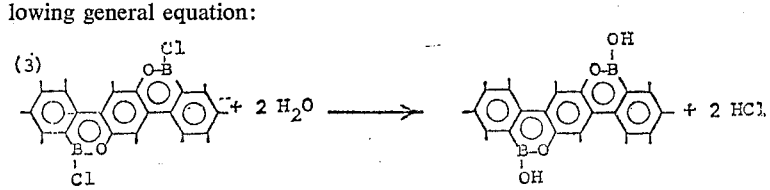

In aqueous solution, the resulting dihydroxy compound is always in monomeric form; however, upon drying it polymerizes even at room temperature to form at least low order polymers of an infusible nature. These polymers appear to be insoluble in most, and perhaps all, common organic solvents when moisture is absent.

In another modification of the invention, the di-chloroheteroaromatic product of Equation 2 hereinbefore is reacted with an organic hydroxide, such as an aliphatic alcohol, according to the following general equation:

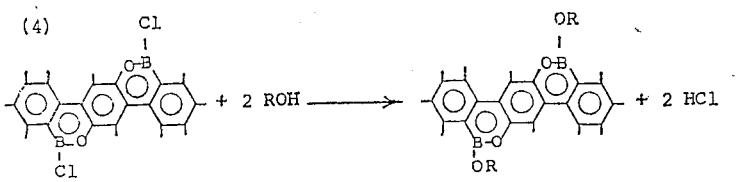

A reaction of this type is desirable carried out at temperatures between about 0 and 100° C. (the range of about 20 to 40° being preferred) and a reaction time of the order of about 5 to 30 minutes. The hydrogen chloride evolved in this reaction may be readily eliminated by evacuation or by blowing with a stream of a dry gas. In this reaction, R may denote an alkyl radical of from 1 to 18 or more carbon atoms or other substituents of the type described hereinbefore as suitable for linkage through an oxygen bridge to a boron atom. The resulting diether product is remarkably stable at elevated temperatures in the absence of moisture. Also, it displays no tendency towards self-induced polymerization.

The organic product of Equation 4 is readily hydrolyzed by even small traces of moisture at room temperature, as exemplified by the following general equation:

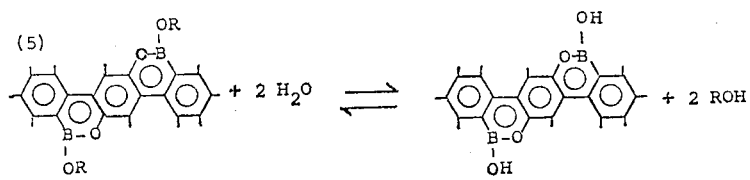

When such hydrolysis takes place by heating the diether in the presence of moist air, rapid polymerization occurs.

The aforesaid polymerization of the dihydroxy compound apparently proceeds upon heating according to the following equation with the monomer units becoming linked by oxygen bridges formed between the boron atoms of adjacent molecules by condensation.

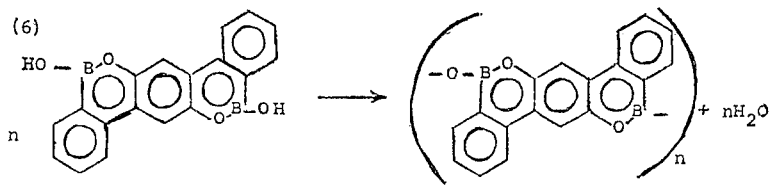

As indicated earlier, the resulting polymers are infusible and also insoluble in most or all of the common organic solvents in anhydrous condition, including, inter alia, benzonitrile, tetrahydrofuran, pyridine, nitrobenzene, quinoline, dimethylformamide and gamma-butyrolactone.

All of the new compounds described herein may be regarded as the dichloro products illustrated in Equation 2 hereinbefore or derivatives thereof. Although the alkylated derivatives having alkyl substituents on nuclear carbon atoms described in certain examples hereinafter are obtained by employing alkylated hydroquinone starting materials, it is also contemplated that the novel organo-boron compounds may be alkylated in similar locations after condensation of the heteroaromatic rings.

For a better understanding of the nature and objects of this invention, reference should be had to the following illustrative examples.

EXAMPLE 1

Preparation of 5,12-dichloro-5,12-dibora-6,13-dioxarodibenz-(a,h)-anthracene

Using the method of Shildneck and Adams described in J. Am. Chem. Soc., 53, 2373 (1931), 2,5-diphenylhydroquinone is prepared as a reactant for the instant process.

In a 2-liter, 4-neck flask fitted with a stirrer, thermometer, nitrogen inlet and condenser, 60 to 80 cc. of boron trichloride is condensed and cooled to $-80°$ C. A very slow stream of dry nitrogen is passed through the flask. A suspension of 22.8 g. of 2,5-diphenylhydroquinone in 500 cc. of dry methylene chloride is added and the mixture is stirred at $-80°$ for 1 hour after this addition; then the reaction mixture is allowed to warm to room temperature over a 16-hour period. During this time, solid material clinging to the sides of the flask in the early stages of the reaction dissolves completely. The reaction flask is then warmed to 40° C. to eliminate excess boron trichloride and the hydrogen chloride produced in the reaction. Next, the residue is evaporated to dryness by applying a vacuum in producing a tan solid intermediate product.

To the same flask containing the crude intermediate product, 250 cc. of dry cyclohexane is added along with 0.2 g. of anhydrous aluminum chloride. This mixture is refluxed for 2.5 hours during which time a gray solid separates and is filtered in producing crude 5,12-dichloro-5,12-dibora-6,13-dioxarodibenz-(a,h)-anthracene.

EXAMPLE 2

Preparation of 5,12-dihydroxy-5,12-dibora-6,13-dioxarodibenz-(a,h)-anthracene

The dichloro product of Example 1 is hydrolyzed by passing a slow stream of moisture laden air from the room through it for 16 hours. The resulting crude product weighs 22.1 g. Trituration with ether, in which the hydroquinone starting material of Example 1 is freely soluble and the desired product insoluble, provides a yield of 16.7 g., or 61 percent of theory, of the desired dihydroxy product. Upon heating this material, it apparently polymerizes without melting.

EXAMPLE 3

Preparation of 5,12-di-n-butoxy-5,12-dibora-6,13-dioxarodibenz-(a,h)anthracene and polymers The dibutyl ether is formed by dissolving the dihydroxy product of Example 2 in a stoichiometric excess of n-butanol and heating to 100° C. for a period of 10 minutes. The product is precipitated in a yield of 79% of theory as slightly yellow crystals which are found to have a melting point of 146.5–148.5° C. Distillation of this material at 250° C. under a subatmospheric pressure of only 1 mm. Hg (absolute) provides a colorless product of the same melting point. The chemical structure of this product is established as 5,12-di-n-butoxy-5,12-dibora-6, 13-dioxarodibenz(a,h)anthracene by chemical analysis and a nuclear magnetic resonance determination. In addition, it is observed that the ultraviolet spectrum is very similar to that of dibenz(a,h)anthracene.

It is also found that this dibutoxy derivative may be prepared by reacting the impure dichloro product of Example 1 with an excess of n-butanol at temperatures of the order of 100° C.

The crystalline diether product remains unchanged under prolonged heating at 135° C. under an absolute pressure of 1 mm. Hg in a dry atmosphere; however, when moist air is admitted intermittently, a noncrystalline polymeric solid is formed and butanol is evolved as a result of hydrolysis of the ether groups. The polymer is observed to be stable and infusible upon heating in air up to 390° C. It is also noted in heating another sample of the polymer under a reduced pressure of only 1 mm. Hg (absolute) in a test tube that the polymer remains stable until slight charring indicative of decomposition occurs upon reaching a temperature estimated at 600–700° C. based on observed softening and deformation of the glass tube.

When a sample of the monomeric diether is dissolved in benzonitrile and refluxed at a temperature of about 190° C., a polymer separates when a slow stream of moist air is bubbled through the solution.

The polymer obtained by heating the diether product in the presence of moisture is also insoluble in both cold and hot tetrahydrofuran, gamma-butyrolactone, quinoline and nitrobenzene; but it dissolves in moist pyridine, dimethylformamide and 2-picoline. However, when the pyridine and dimethylformamide solutions of this material are each separately refluxed for a number of hours in apparatus arranged to pass the condensate through a tube containing pellets of Linde 4–A molecular sieve to remove any moisture from the condensate before returning it to the heated vessel, the dissolved material precipitates. In view of this, it is doubtful that any of the three solvents mentioned actually form true solutions of the polymer, for it is thought that traces of water in the solvents convert the polymer to the monomeric dihydroxy derivative by hydrolysis.

EXAMPLE 4

Preparation of 5,12-di-t-butoxy-5,12-dibora-6,13-dioxarodibenz-(a,h)anthracene

The dihydroxy product from Example 2 is refluxed in a large excess of t-butyl alcohol. Benzene is added to azeotropically remove the water formed. After the solid starting material is nearly dissolved, the solution is filtered and allowed to cool. A 63% yield of the di-t-butoxy ether, identified by nuclear magnetic resonance, is obtained.

EXAMPLE 5

Preparation of 5,12-di-n-hexadecoxy-5,12-dibora-6,13-dioxarodibenz(a,h)anthracene This derivative is prepared by reacting 1 mol of the dihydroxy product of Example 2 in benzene and 2 mols of n-hexadecanol by heating to reflux temperature under atmospheric pressure for several hours. Precipitation occurs and the dihexadecoxy derivative is separated by filtration in a yield of 94% and found to have a melting point of 102–105° C.

EXAMPLE 6

Preparation of 1,3,8,10-tetramethyl-5,12-di-n-butoxy-5,12-dibora-6,13-dioxarodibenz(a,h)anthracene 2,5-bis(2,4-dimethylphenyl)-hydroquinone is prepared by the method described by Browning and Adams, J. Am. Chem. Soc. 52, 4098 (1930).

The tetramethyl-dibutoxy-heteroaromatic product is prepared from this hydroquinone by adding 39 g. of the hydroquinone in solution in 1000 g. of warm methylene chloride to 200 cc. of boron trichloride at −80° C. in a 5-liter, 4-neck flask fitted as described in Example 1. A slow stream of nitrogen and boron trichloride is passed through the reactor during the reaction. After this addition is complete, the mixture is stirred for one hour at −80°; then it is allowed to warm gradually to room temperature over 16 hours. Excess boron trichloride and solvent are eliminated as in Example 1. Next, a 500 cc. portion of cyclohexane and about 1 g. of anhydrous aluminum chloride are added. The solution is stirred and refluxed for 3 hours. During this time a pink solid separates. The cyclohexane is evaporated, 1300 cc. of n-butyl alcohol is added, and the product is stirred and heated until dissolved. Upon cooling, the white dibutyl ether separates and is recovered by filtration.

The product is obtained in a yield of 86% by weight and is found to have a melting point of 168–173° C. The physical and chemical properties of this material are substantially the same as those of the monomeric product of Example 3 wherein the aromatic rings are devoid of methyl substituents.

The dibutyl ether product here is readily convertible into the corresponding dihydroxy compound by the addition of a small amount of water and the hydrolysis product is readily polymerized by heating in forming a polymer similar to the polymer of Example 3 in respect of solubility characteristics and high heat resistance.

The novel difunctional heteroaromatic compounds and their preparation and derivatives have been described in considerable detail, especially in the foregoing illustrative examples; however, it will be readily apparent to those skilled in the art that numerous variations and modifications may be made in the processes and products described. Accordingly, the present invention should not be regarded as limited in any particulars except as may be recited in the appended claims or required by the prior art.

I claim:

1. Polynuclear heteroaromatic compounds consisting essentially of at least one structural unit according to the following type formula:

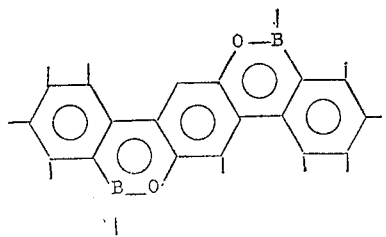

wherein a member of the group consisting of hydrogen and halogen atoms and hydrocarbyl, halogenated hydrocarbyl, hydrocarbyloxy, nitro and cyano radicals is attached to each nuclear carbon atom and a member of the group consisting of halogen and bridging oxygen atoms and hydroxyl, hydrocarbyloxy, halogenated hydrocarbyloxy, aminoethoxy, N - hydrocarbyl - aminoethoxy, and N,N-dihydrocarbyl-aminoethoxy radicals is attached to each boron atom.

2. Condensation polymers having repeating monomer units having the structure of claim 1 linked through extranuclear oxygen bridges between the boron atoms.

3. Polynuclear heteroaromatic compounds having the following general formula:

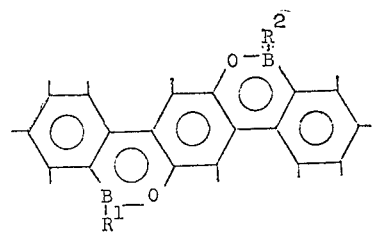

wherein $R^1$ and $R^2$ each represent a substituent of the group consisting of a chlorine atom and hydroxyl and hydrocarbyloxy radicals; and a member of the group consisting of hydrogen and halogen atoms and hydrocarbyl, halogenated hydrocarbyl, hydrocarbyloxy, nitro and cyano radicals is attached to each nuclear carbon atom.

4. 5,12 - dichloro-5,12-dibora-6,13-dioxarodibenz(a,h) anthracene.

5. 5,12 - dihydroxy - 5,12 - dibora-6,13-dioxarodibenz-(a,h)-anthracene.

6. Diethers of 5,12 - dibora-6,13-dioxarodibenz(a,h)-anthracene.

7. 5,12 - dialkoxy - 5,12 - dibora-6,13-dioxarodibenz-(a,h)-anthracene.

8. 5,12 - di - n-hexadecoxy-5,12-dibora-6,13-dioxarodibenz(a,h)anthracene.

9. 1,3,8,10 - hydrocarbyl - 5,12-dibora-6,13-dioxarodibenz(a,h)anthracenes.

10. 1,3,8,10 - tetramethyl-5,12-di-n-butoxy-5,12-dibora-6,13-dioxarodibenz(a,h)anthracene.

11. A condensation polymerization process which comprises heating a dihydroxy derivative of a compound according to claim 1.

References Cited

UNITED STATES PATENTS 3,287,270  11/1966  McCabe et al. _____ 252—49.6

OTHER REFERENCES

Dewer et al.: J. Chem. Soc., 1960, 1344–1347.
Abel et al.: J. Chem. Soc., 1956, 4697–4699.
Flory: Polymer Chemistry, Ithaca, N.Y., Cornell Univ. Press, 1953, p. 40.

WILLIAM H. SHORT, Primary Examiner.

M. GOLDSTEIN, Assistant Examiner.

U.S. Cl. X.R.

252—49.6, 400; 260—47